C. C. SELF.
CHURN.
APPLICATION FILED OCT. 31, 1912.
1,051,277.
Patented Jan. 21, 1913.
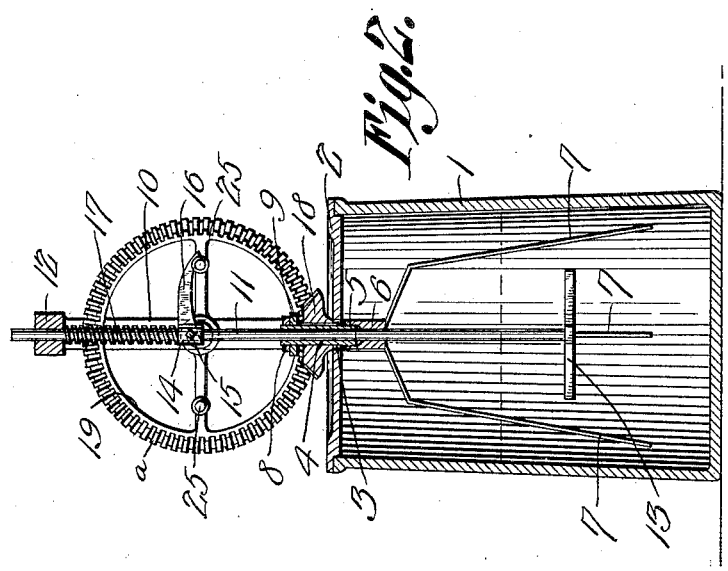
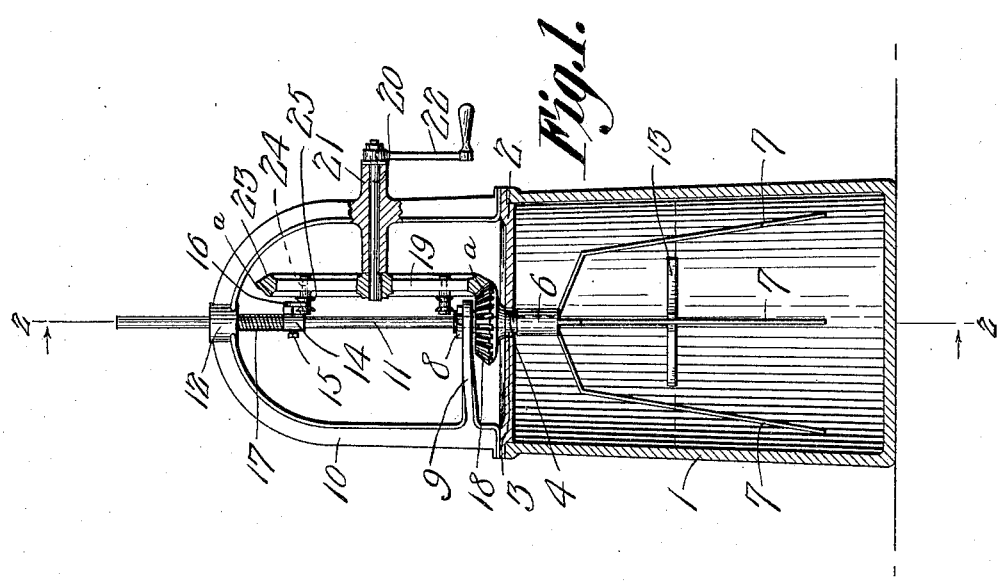
C. C. Self,
Inventor.
Witnesses
by C. A. Snow & Co.
Attorneys

UNITED STATES PATENT OFFICE.

CHRISTOPHER COLUMBUS SELF, OF BARHAM, LOUISIANA.

CHURN.

1,051,277.  Specification of Letters Patent.  Patented Jan. 21, 1913.

Application filed October 31, 1912. Serial No. 728,960.

*To all whom it may concern:*

Be it known that I, CHRISTOPHER C. SELF, M. D., a citizen of the United States, residing at Barham, in the county of Vernon and State of Louisiana, have invented a new and useful Churn, of which the following is a specification.

The present invention relates to improvements in churns, the primary object of the invention being the provision of a churn in which the dasher member is composed of a rotary portion and a vertically reciprocatory portion, there being novel means provided for operating these portions in unison so that the full mass of cream is properly agitated and circulated throughout the churn receptacle to produce butter in the shortest possible time and to extract or congeal all of the butter fat contained in the cream.

A further object of the present invention is the provision of a manually operated means for imparting simultaneous rotation to a rotary member of a dasher and a reciprocatory movement to the reciprocatory member, this reciprocatory member being moved in one direction by the tension of a spring, and being opposed by the manually operated mechanism for moving such reciprocatory member against the tension of the spring.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings Figure 1 is a vertical central sectional view of the complete churn, the frame for carrying the gearing being shown in elevation. Fig. 2 is a section taken on line 2—2 of Fig. 1.

Referring to the drawings, the numeral 1 designates the churn receptacle, which is sealed by the mechanism carrying cover 2 provided with the concentric aperture 3 therethrough. Projecting through this aperture and mounted for rotation is a sleeve 4 whose lower end 5 is threaded to carry the sleeve 6 which is provided with the downwardly and outwardly inclined plate 7, which constitutes the rotary member of the dasher. A disk 8 is keyed upon the upper end of the sleeve 4 and provides a means for retaining the sleeve against downward movement and properly mounted for rotation within the inner terminal of the arm 9 which is fixed to the U-shaped frame 10 mounted upon the cover 2.

A rod 11 is mounted for reciprocation within the sleeve 5 and also to the bearing sleeve 12 carried by the frame 10, said rod 11 having its lower end projected within the churn body 1 and within the arms 7 of the rotary dasher member, and upon the extreme lower end of the rod 11 is carried the dasher member 13 which constitutes the reciprocatory dasher member.

A sleeve 14 is mounted upon the rod 11 between the arm 9 and the bearing sleeve 12 and is held at the desired adjustment by means of the set screw 15, said sleeve having fixed thereto and carried thereby the curved arm 16, the purpose of which will presently appear. Mounted upon the rod 11 between the sleeves 14 and 12 and exerting a tension downwardly, is a coiled spring 17.

Keyed upon the sleeve 4 above the cover 2 is a small bevel pinion 18, which meshes with the beveled teeth *a* of the large bevel pinion or driving gear 19, said driving gear 19 being mounted upon the shaft 20 which is journaled in the sleeve 21 carried by the frame 10. Keyed upon the outer end of the shaft 20 to permit the manual rotation of the driving gear 19, is a crank 22. This crank as is evident may be removed and a power pulley or other means may be connected to the shaft 20 to operate churns of large capacity.

Connected to the spokes of the large driving gear 19, are pins 24, the same being so connected as to be readily removed to project from either side of the driving gear 19 and upon each of the pins 24, is journaled the spool-shaped roller 25, which is adapted, as the driving gear 19 is rotated to engage the arm 16 and thus elevate the sleeve 14 and rod 11 against the tension of the spring 17, the continued rotation of the driving gear 19 removing the roller 25 from beneath the arm 16 and permitting the rod 11 and its dasher member 13 to be propelled downwardly. Thus, the action of the driving gear 18 and the spring 17 will impart the desired reciprocatory movement to the rod 11 and the dasher member 13, while the gears 19 and 18 will rotate the rotary members 7.

The pinion 18 may be removed and a friction member substituted in lieu thereof, at which time the driving gear 19 is removed from the shaft 20 and reversed so that its friction surface 23 will be placed in engagement with such friction wheel.

What is claimed is:

1. A churn, including a receptacle, a lid therefor, a two-part dasher, one part of which is disposed for rotation while the other part of which is disposed for reciprocation, a frame carried by the lid, a rotary driving device journaled in the frame and operably connected to the rotary part of the dasner, a rod mounted for reciprocation within the frame and through the cover and carrying the reciprocatory part of the dasher, a spring mounted upon said rod for moving the same in one direction, and co-acting means carried by the rod and the rotary driving device for operating the rod and reciprocatory part of the dasher in opposition to the spring.

2. A churn, having a cover, a frame carried by the cover, a sleeve journaled in the frame and projecting through the cover, a rotary dasher member journaled upon the sleeve below the cover, a pinion keyed upon the sleeve exteriorly of the cover, a reciprocatory rod mounted in the frame and through the sleeve and within the dasher member, a reciprocatory dasher member carried upon the lower end of the rod, a spring mounted upon the rod for moving the rod in one direction, a driving gear journaled in the frame and in mesh with the pinion, and co-acting means carried by the driving gear and rod for moving the rod in opposition to the spring.

3. A churn, having a cover, a frame carried by the cover, a sleeve journaled in the frame and projecting through the cover, a rotary dasher member journaled upon the sleeve below the cover, a pinion keyed upon the sleeve exteriorly of the cover, a reciprocatory rod mounted in the frame and through the sleeve and within the dasher member, a reciprocatory dasher member carried upon the lower end of the rod, a spring mounted upon the rod for moving the rod in one direction, a driving gear journaled in the frame and in mesh with the pinion, a sleeve mounted upon the rod, an arm carried thereby, and means mounted upon the driving gear and in the path to engage the arm to operate the rod in opposition to the spring.

In testimony that I claim the foregoing as my own, I have hereto affixed my signature in the presence of two witnesses.

CHRISTOPHER COLUMBUS SELF.

Witnesses:
J. B. NAUMAN,
S. N. TURNER.

Copies of this patent may be obtained for five cents each, by addressing the "Commissioner of Patents, Washington, D. C."